United States Patent [19]
Scott et al.

[11] 3,804,353
[45] Apr. 16, 1974

[54] CONDENSER INSTALLATION FOR AIRCRAFT AIR-CONDITIONING SYSTEM

[75] Inventors: Robert C. Scott; John A. Flinchum, both of Vero Beach, Fla.

[73] Assignee: Piper Aircraft Corporation, Vero Beach, Fla.

[22] Filed: Aug. 28, 1972

[21] Appl. No.: 284,085

[52] U.S. Cl. .............................. 244/57, 123/41.43
[51] Int. Cl. ............................................ B64d 33/12
[58] Field of Search ........ 244/1 R, 1 SC, 57, 129 R, 244/118 R; 123/41.43, 41.48; 165/41–44; 62/DIG. 5

[56] References Cited
UNITED STATES PATENTS

| | | | |
|---|---|---|---|
| 2,249,948 | 7/1941 | Dornier | 244/57 |
| 2,272,664 | 2/1942 | Gropler | 244/42 A |
| 3,583,658 | 6/1971 | Herweg | 244/1 |
| 2,365,223 | 12/1944 | Silverstein et al. | 244/57 |
| 2,291,607 | 8/1942 | Chausson | 244/57 |
| 3,563,307 | 2/1971 | Paine | 244/57 |

FOREIGN PATENTS OR APPLICATIONS 392,140   8/1931   Great Britain ...................... 244/57

*Primary Examiner*—Duane A. Reger
*Assistant Examiner*—Jesus D. Sotelo

[57] ABSTRACT

The system includes a compressor driven by the aircraft engine for supplying pressurized heat laden vapor to a condenser. The condenser supplies refrigerant in liquid form to a receiver-dehydrator for delivery to an evaporator through an expansion valve. The evaporator absorbs the heat from the aircraft cabin and the refrigerant vapor returns to the compressor whereupon the refrigerating cycle is repeated. The condenser is extensible and retractable relative to the aircraft between positions dependent therefrom in the air stream and a stowed position within the confines of the aircraft fuselage. Particularly, the condenser is hingedly mounted by a bell crank assembly and is extensible on command during flight or on the ground. When the air-conditioning system is operating, the compressor is automatically declutched from the engine and the condenser is automatically retracted in response to movement of the throttle to a full or near full open throttle position. Also, the compressor is automatically clutched to the engine and the condenser is automatically extended in response to movement of the throttle away from the full or near full open throttle position. In this manner, maximum power is made available at the critical times, such as take-off, while simultaneously the drag of the condenser is eliminated.

9 Claims, 6 Drawing Figures

PATENTED APR 16 1974

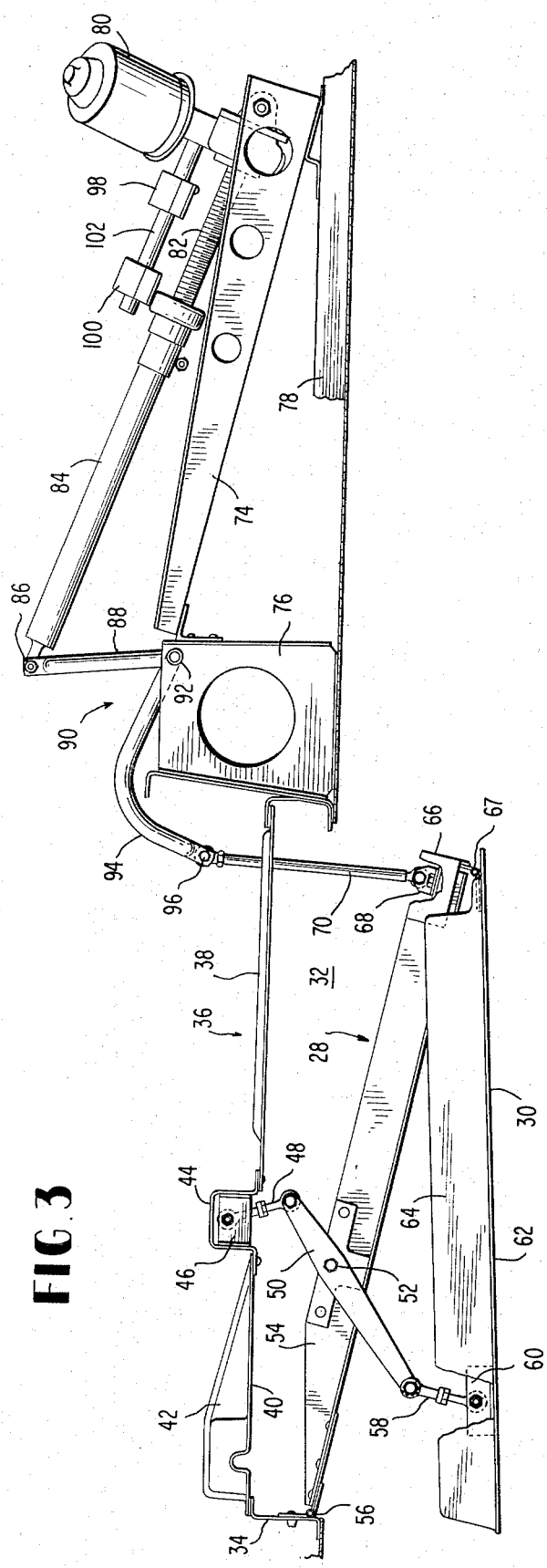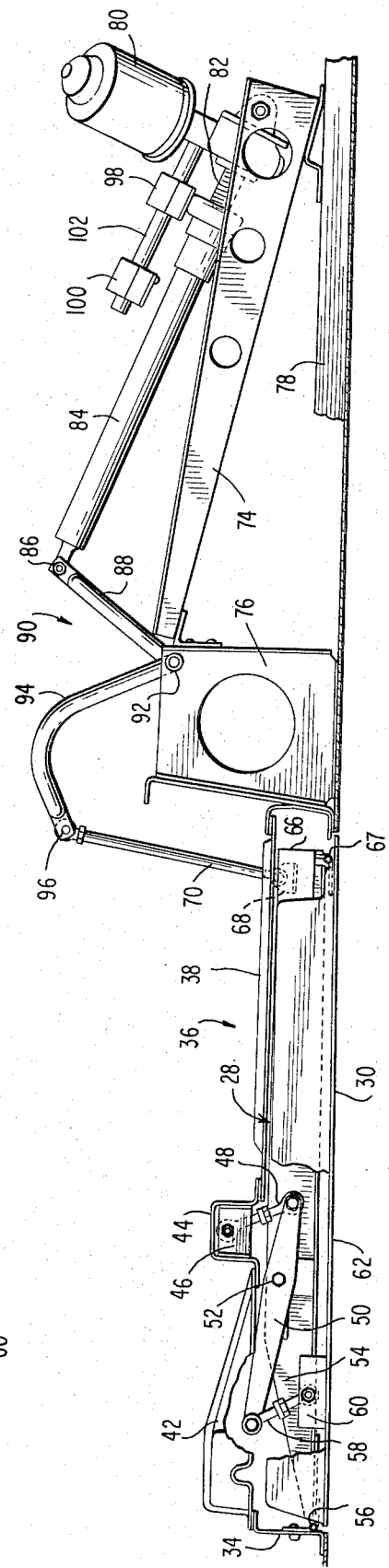

CONDENSER INSTALLATION FOR AIRCRAFT AIR-CONDITIONING SYSTEM

The present invention relates to an air-conditioning system for installation in aircraft and particularly relates to an aircraft air-conditioning system having a condenser extensible and retractable between positions depending from the aircraft in the air stream and a stowed position within the aircraft respectively.

A host of air-conditioning systems for aircraft have been proposed and constructed in the past. However, most systems do not operate at optimum efficiency, for example, when the aircraft is sitting on the ground prior to take-off. A principle reason for this lack of efficient air-conditioning, particularly when the aircraft is on the ground, is the inefficient cooling of the condenser coils which serve to change the state of the refrigerant from a vapor to a liquid. This is, in part, caused by a lack of efficient heat transfer between the coil fins and the surrounding heat sink. Further, attempts to increase the capacity of aircraft air-conditioning systems usually result in increased loading on the aircraft engine with consequent reduction of the power available to the engine. This increased loading on the engine by a non-essential aircraft subsystem can become critical particularly where maximum power is required, for example, when the aircraft is taking off.

The present invention provides an air-conditioning system for aircraft which minimizes and/or eliminates the above-discussed and other problems associated with prior aircraft air-conditioning systems and provides a novel and improved aircraft air-conditioning system having various advantages in construction, mode of operation, and result in comparison with such prior systems. The principal features of the present aircraft air-conditioning system include its capacity to operate efficiently while the aircraft is on the ground prior to take-off or after landing as well as increased operating efficiency at cruising altitudes. Further, this is achieved without increasing the engine loading. Also, in the present system, maximum power is made available during those critical times, such as take-off, when maximum power is required.

To these and other ends, the present invention provides an aircraft air-conditioning system including a compressor driven by the aircraft engine via a magnetic clutch. The pressurized heat laden vapor from the compressor adjacent the engine flows to a condenser where it is cooled and changed to a liquid state. The liquid refrigerant then passes to a receiver-dehydrator and into evaporator coils via an expansion valve. The evaporator coils absorb the aircraft cabin heat and return the vaporized refrigerant to the compressor where the cycle is repeated. A principle feature of the present invention resides in the mounting of the condenser in the aircraft whereby increased efficiency of heat transfer is obtained. Particularly, the condenser is extensible to a position dependent from the aircraft adjacent the bottom of the fuselage tail section whereby it is located in the air stream at cruising altitude and in the slipstream of the propeller when the aircraft is on the ground. Further, the condenser is retractable to a stowed position within the aircraft, i.e., within the confines of the aircraft fuselage, when air conditioning is not required. By lowering the condenser into the slipstream of the propeller when the aircraft is sitting on the ground or into the air stream at cruising altitude, efficient transfer of heat from the condenser coils to the surrounding heat sink is effected.

It is a further feature hereof that the increased loading on the aircraft engine, caused by the operation of the aircraft's air-conditioning subsystem, is automatically eliminated when maximum engine power is required. When the air-conditioning system is operating with the condenser extended and maximum power is required, i.e., at take-off, the condenser is automatically retracted into the fuselage and simultaneously the compressor is automatically declutched from the engine, each in response to movement of the throttle to a near or full open position. Consequently, the air-conditioning subsystem does not load the engine whereby maximum power is made available. Also, the drag of the extended condenser is eliminated by its automatic retraction to a location within the aircraft thus further reducing engine loading. A further feature hereof resides in the automatic extension of the condenser from its retracted position and clutching of the compressor to the aircraft engine in response to slight retardation of the throttle from its full or near full open throttle position. Thus, the air-conditioning system is automatically returned to operation at optimum efficiency when maximum power is no longer required.

Specifically, the condenser is pivotally carried by a bell crank assembly. The bell crank assembly is operated by a lead screw driven by an electric motor. The electric motor is under control of a master air-conditioning switch on the control panel of the aircraft as well as a throttle switch and drives the lead screw in opposite directions for respective extension and retraction of the condenser relative to the aircraft. The bottom of the condenser mounting assembly constitutes a door which mounts flush with the skin of the fuselage when the condenser lies in its retracted position.

Accordingly, it is a primary object of the present invention to provide a novel and improved air-conditioning system for an aircraft.

It is another object of the present invention to provide a novel and improved condenser installation for aircraft air-conditioning systems whereby increased efficiency of heat transfer is obtained.

It is still another object of the present invention to provide a novel and improved condenser installation for aircraft air-conditioning systems wherein the condenser is movable between positions dependent from and retracted within the aircraft.

It is a further object of the present invention to provide a novel and improved air conditioning system for aircraft having the foregoing characteristics and including a compressor which is automatically declutched from the engine and a condenser which is automatically retracted within the aircraft in response to movement of the throttle to its full open or near full open position whereby engine loading by the air conditioning system, at times of peak power requirements, is automatically eliminated.

It is a still further object of the present invention to provide a novel and improved air conditioning system for aircraft having the foregoing characteristics and including a compressor which is automatically clutched to the engine and a condenser which is automatically extended from the aircraft for increased heat transfer in response to slight retardation of the throttle from its full open or near full open position whereby the air conditioning system is automatically returned to full operation at optimum efficiency when maximum power is not needed.

It is a related object of the present invention to provide a condenser installation for aircraft air conditioning systems having the foregoing characteristics wherein the assembly for extending and retracting the condenser is comprised of parts readily, easily and economically manufactured and assembled.

These and further objects and advantages of the present invention will become more apparent upon reference to the following specification, appended claims, and drawings wherein:

FIG. 3 is an enlarged fragmentary side elevational view of the mounting and actuating assembly for the condenser and illustrating the latter in a lowered or dependent position relative to the aircraft;

FIG. 4 is a view similar to FIG. 3 illustrating the mounting and actuator assembly for the condenser in a raised stowed position;

Figure 1:
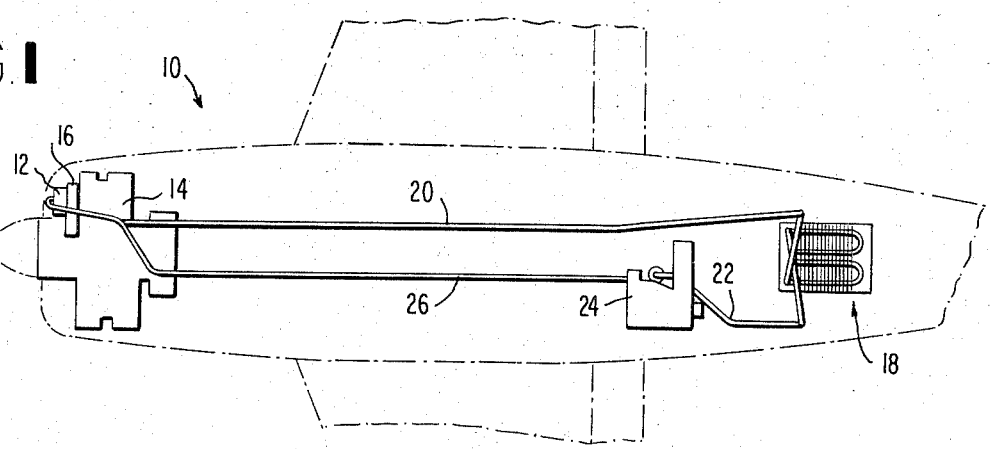
FIG. 1 is a fragmentary plan view of an aircraft carrying an air conditioning system constructed in accordance with the present invention.

Referring now to FIG. 1, there is illustrated an aircraft, generally indicated 10, carrying an air conditioning system comprised generally of a compressor 12 driven by the aircraft engine 14 through a magnetic clutch 16. Compressor 12 serves to pressurize heat laden vapor for delivery to a condenser, generally indicated 18, via a refrigerant carrying line or conduit 20. Operation of the compressor 12 is controlled by a thermostat, not shown, which actuates the magnetic clutch to alternately clutch or declutch the engine and compressor. As described in the ensuing description, condenser 18 is extensible from the aircraft into the airstream whereupon the condenser coils and fins radiating therefrom are cooled by the airstream which provides the heat sink necessary to condense the high pressure refrigerant vapor. The liquid refrigerant from the condenser flows via a fluid line 22 to an evaporator assemblage 24. The evaporator assemblage includes a receiver/dryer which serves as a system reservoir and contains a desiccant for absorbing moisture, an over-pressure switch to avoid system overload, a thermostatic expansion valve for sensing heat load on the evaporator and metering the refrigerant, high and low service valves, a motor driven fan and an evaporator coil for cooling and dehumidifying the cabin air. The elements of the evaporator assemblage are per se conventional and further description thereof is believed unnecessary. The refrigerant, in a vapor state, flows from evaporator assemblage 24 to compressor 12 via a conduit 26 whereupon the refrigeration cycle is repeated.

Figure 2:
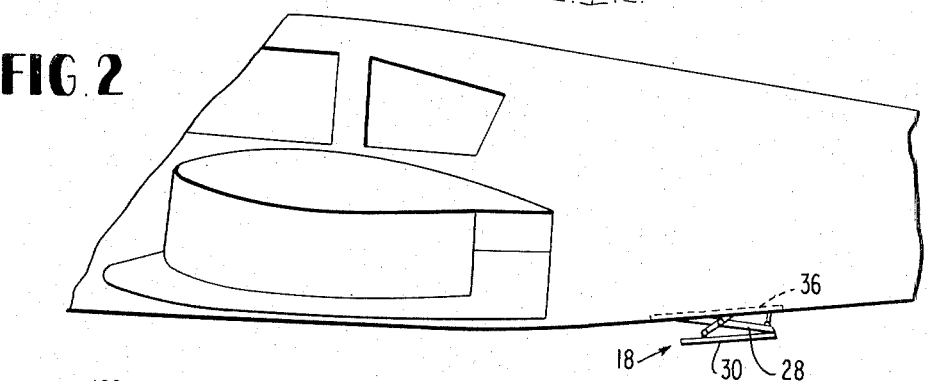
FIG. 2 is a fragmentary enlarged side elevational view of the aircraft illustrating the condenser, which forms a part of the air conditioning system, in an extended position.

Referring now to FIG. 2, the condenser 18 is carried for movement by a bellcrank assembly indicated 28 between an extended position as illustrated wherein the condenser 18 is exposed in the airstream and a stowed position wherein the condenser lies within the confines of the aircraft fuselage. The bellcrank assembly 28 also carries a portion of the aircraft's skin 30 which, when the condenser is retracted within the fuselage, lies flush along the underside of the fuselage with the surrounding fuselage skin.

Referring now to FIGS. 3 and 4, the bottom portion of the fuselage tail section is provided with an opening 32. The margins about the opening 32 are provided with upturned flanges 34 which, at a location inset from opening 32, mount a cover assembly generally indicated 36. Cover assembly 36 includes an aft cover plate 38, a forward cover plate 40 having raised portions 42 for accommodating parts of the condenser mounting assembly, and an intermediate inverted channel shaped cover 44. A bracket 46 is suitably secured adjacent each of the opposite ends of the intermediate cover plate 44 and each bracket 46 pivotally mounts one end of a push rod 48. The opposite end of push rod 48 is pivotably coupled to a link 50 which, in turn, is pivotably coupled at 52 to a slide support 54 for the condenser 18. Condenser 18 is mounted between the side supports 54 by suitable connecting structure, not shown. Side supports 54 thus comprise a part of a condenser support frame assembly and are pivotably secured at their forward ends to the forward upright flange 34 by a piano type hinge, indicated 56. The condenser frame assembly includes an open framework, not shown, extending between the side supports whereby air can pass through the frame assembly and the coils and fins of the condenser supported thereby when the condenser lies in the extended inclined position.

Each of the opposite ends of levers 50 pivotally connect with a push rod 58. The lower end of each push rod 58 pivotally connects with a bracket 60 carried on a door assembly 62. The door assembly 62 carries upturned side flanges 64 which support skin 30 and is pivotally mounted by a pinned connection 67 to the aft end of the condenser support assembly. A transversely extending bracket 66 extends between the aft ends of the supports 54 and carries a pair of angle brackets 68 for pivotally mounting the lower end of a rod 70 which forms a part of an actuator assembly for raising and lowering the condenser 18 and door 30, the actuator assembly being generally indicated at 72.

The actuator assembly 72 includes an upwardly opening channel shaped support 74 extending between a pair of transversely spaced brackets 76 and a supporting frame which forms a part of the fuselage structure. Adjacent the aft end of bracket 74, there is pivotally mounted a lead screw and motor assemblage including an electric motor 80 coupled, through suitable gearing, not shown, to a lead screw 82. Lead screw 82 threadedly engages within an internally threaded tube 84 which is pivotally connected at 86 to one leg 88 of a bellcrank, generally indicated 90. Leg 88 is secured to a tube 92 which is pivotally connected between brackets 76. Another leg 94 of bellcrank assembly 90 is secured at one end to tube 92 and extends arcuately to terminate at its opposite end in a pivotal connection 96 with the upper end of rod 70.

It will be appreciated that by virtue of bellcrank linkages 28 and 90, the condenser is pivotable between an inclined position extended from the fuselage and a retracted position stowed within the recess defined by opening 32, cover plates 38, 42 and 44, and side flanges 34. Also, the door assembly 62 is pivotable therewith and, when the condenser is retracted, the skin 30 carried thereby lies flush with the skin of the fuselage. Particularly, rotation of lead screw 82 in one direction by reversible motor 80 causes tube 84 to advance therealong. This, in turn, rotates bellcrank 90 in a counterclockwise direction as illustrated in FIG. 4 to extend rod 70 from the aircraft. Rod 70 thus pivots the condenser support frame about hinge 56 in a clockwise direction to the inclined position illustrated in FIG. 3. Note that the condenser coils and fins are thus inclined relative to the airstream whereby air readily passes over the coils and between the fins. The pivotal action of side supports 54 about hinge 56 also causes the links 50 and push rods 48 and 58 to pivot door assembly 62 and hence the fuselage skin 30 carried thereby in an opposite or counter-clockwise direction about the hinge 67 to a position spaced from the aircraft and almost parallel to the fuselage skin. Note that the leading edge of the door assembly is spaced a considerable distance, i.e., about 5 inches, from the fuselage skin and this, in effect, serves to channel the airstream between the fuselage skin and skin 30 through the inclined condenser carried by the supports 54. To retract the condenser the lead screw is driven by motor 80 in the opposite direction whereby the condenser support frame is pivoted by bellcrank 90 and rod 70 in a counterclockwise direction into the position illustrated in FIG. 4. Also, such pivoting action causes the links 50 and push rods 48 and 58 to retract door assembly 62 to a position wherein skin 30 lies flush with the fuselage skin. A pair of limit switches 98 and 100 are mounted on a rod 102 carried by the actuator assembly 72. The aft end of sleeve 84 carries a flange which engages with the actuating arms of the limit switches 98 and 100 at the closed and open positions respectively of the door assembly 62. Limit switches 98 and 100 are adjustably mounted along rod 102 whereby full open and full closed positions can be obtained.

Figure 6:
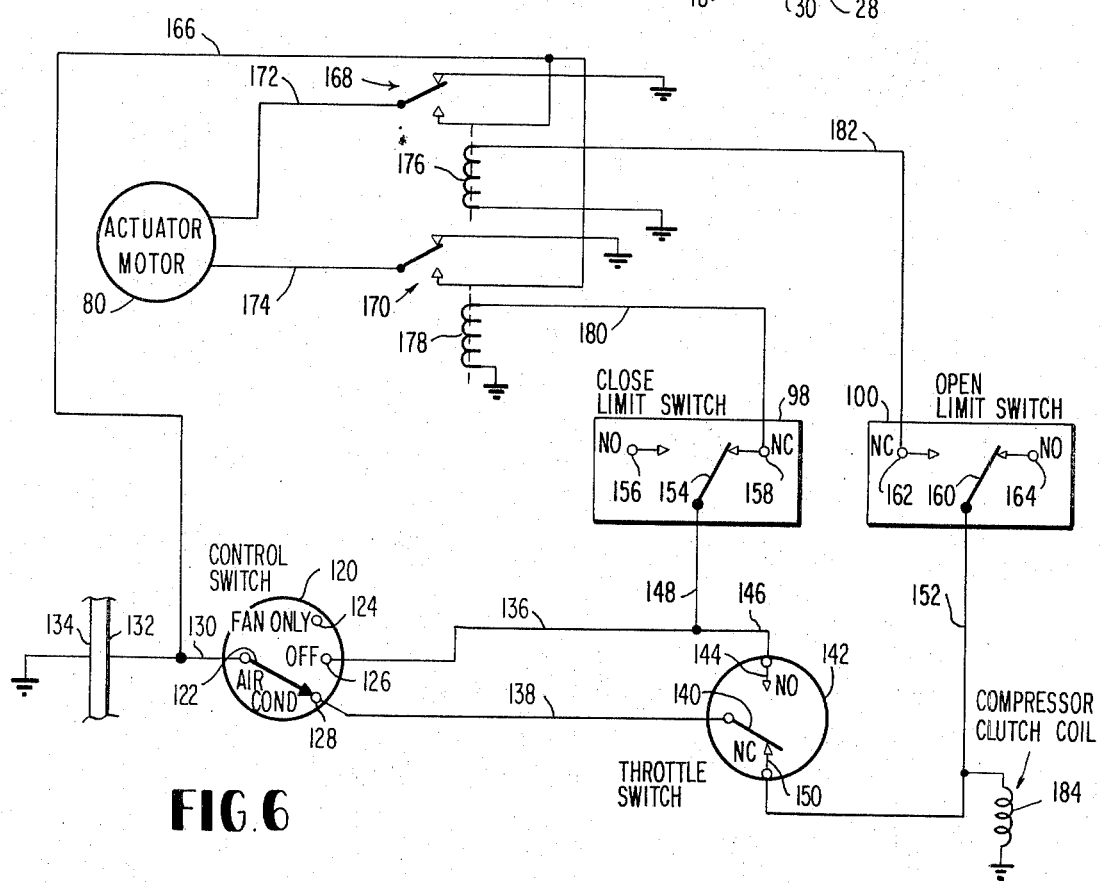
FIG. 6 is schematic illustration of an electrical circuit for use in connection with the air conditioning system hereof.
Figure 5:
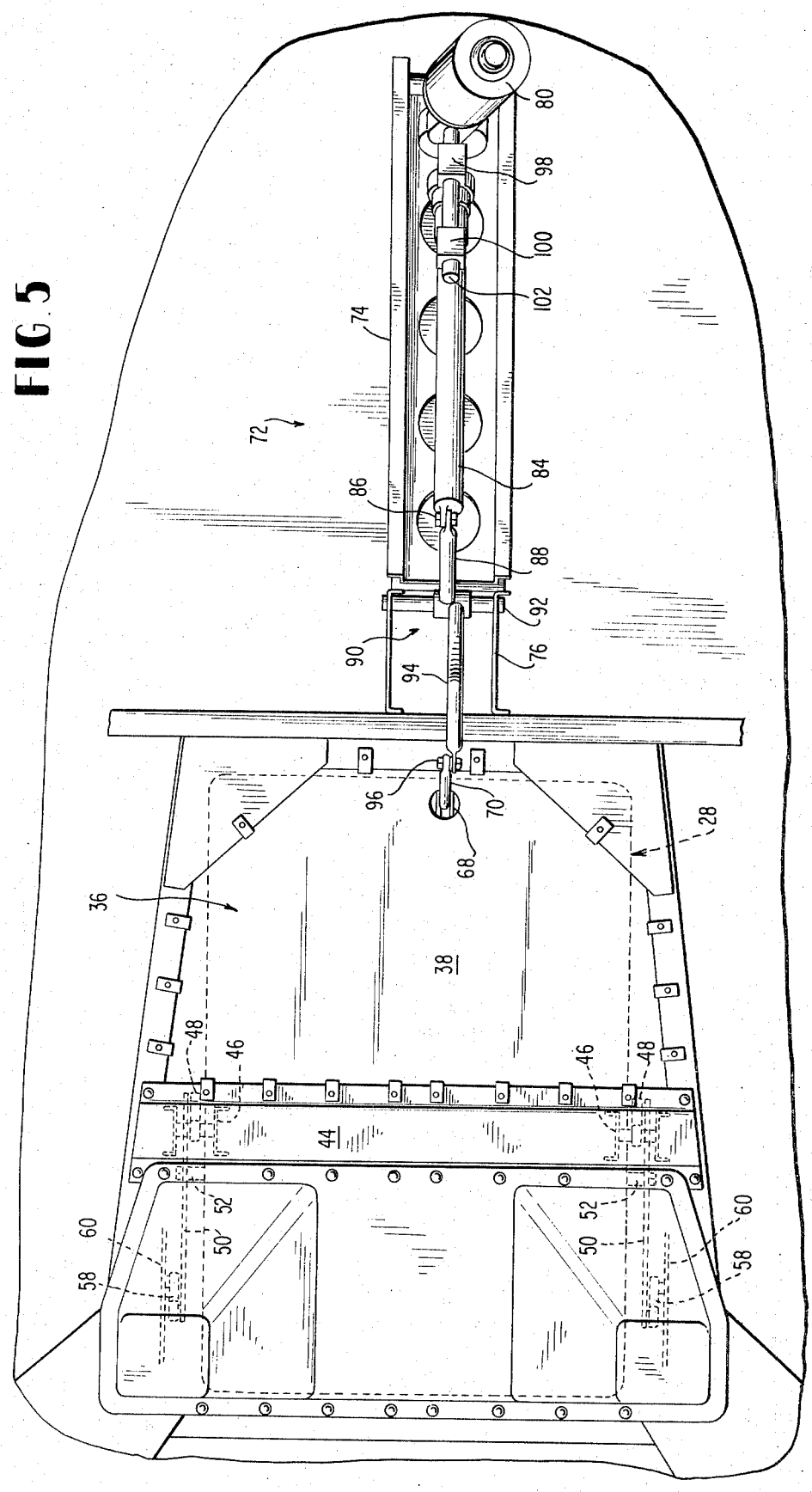
FIG. 5 is a plan view thereof.

FIG. 6 is a simplified wiring diagram showing the circuitry for extending and retracting the condenser 18 relative to the fuselage. In FIG. 6 control switch 120 is shown as having a manually movable contact 122 which may be moved by the pilot into any one of three positions, namely, into engagement with a stationary "fan only" contact 124, an "off" stationary contact 126 or an "air conditioning" stationary contact 128. Movable contact 122 is connected by an electrical lead 130 to one side 132 of the aircraft power supply bus whose other side illustrated at 134 is shown as grounded.

When control switch contact 122 enages stationary contact 124 electrical energy from the aircraft power supply bus is passed through the control switch 120 to a suitably circuitry (not shown) for driving the fan. When movable contact 122 engages stationary contact 126 an electrical connection is established through a lead 136 for a purpose more fully described below. Finally, when movable contact 122 of the control switch engages stationary contact 128 electrical energy from the aircraft power supply passes by way of a lead 138 to the movable contact 140 of a throttle switch 142. Throttle switch 142 is provided with a normally open stationary contact 144 connected by leads 146 and 148 to the close limit switch 98. Similarly, throttle switch 142 is provided with a normally closed stationary contact 150 connected by a lead 152 to the open limit switch 100. Limit switch 98 includes a movable contact 154 connected to lead 148 and movable between a normally open stationary contact 156 and a normally closed stationary contact 158. Lead 152 is connected to the movable contact 160 of open limit switch 100 which contact may selectively engage either normally closed contact 162 or normally open contact 164. By way of example only, close limit switch 98, open limit switch 100, and throttle switch 142 may be conventional microswitches in which the movable contact when the switch is in the unactuated condition engages the normally closed contact such as stationary contact 150 of switch 142 and it is moved into engagement with the normally open contact such as contact 144 of throttle switch 142 only when the microswitch actuator is depressed. The microswitch actuator of throttle switch 142 is depressed and the switch actuated when the throttle is moved to the full open position or full throttle position. Close limit switch 98 is actuated when the condenser 18 moves to a position fully retracted within the aircraft and correspondingly open limit switch 100 is actuated only when the condenser is fully extended from the aircraft.

The condenser 18 is extended and retracted by reversible motor 80 connected to the aircraft power supply bus by way of a lead 166, a condenser door open relay generally indicated at 168, a condenser door close relay generally indicated at 170 and corresponding lead 172 and 174. The coil of relay 168 is illustrated at 176 and the coil of relay 170 is illustrated at 178. Relay coil 176 is connected to open limit switch 100 by a lead 180 and coil 178 is connected to close limit switch 98 by a lead 180.

In FIG. 6 the switches are shown in the positions they assume when the condenser door is fully open and the throttle is not in its most advanced or full throttle position. In this condition, movable contact 122 of control switch 120 is in the "air conditioning" position but no electrical current is supplied through throttle switch 142 to relay coil 176 because limit switch 100 is open, breaking the circuit to relay coil 176. If movable contact 122 of control switch 120 is now moved to the "off" position, electrical energy is supplied by way of lead 136 and lead 148, normally closed contact 158 of switch 98 and lead 180 to relay coil 178 actuating relay 170 and energizing motor 80 by way of lead 174. The motor 80 drives the condenser door to the closed position at which time close limit switch 98 is opened and the motor de-energized. In order to open the condenser door, movable contact 122 of control switch 120 is moved from the "off" contact 126 to the "air conditioning" contact 128. Since the door is initially closed, movable contact 154 of close limit switch 98 is engaging normally open contact 156 and movable switch 160 of open limit switch 100 is engaging normally closed contact 162. In this case, electrical energy is supplied through throttle switch 142 and open limit switch 100 to the coil 176 of door open relay 168 so that door motor 80 is energzied by way of lead 172. Motor 180 drives the door to the fully opened position or until open limit switch 100 is engaged by the door mechanism so that it moves to the open circuit position illustrated in FIG. 6 at which time relay 168 opens and the motor 80 is de-energized.

It is a feature of the present invention that the condenser door is automatically closed when the throttle is moved to a near open or full throttle position. Movement of the throttle to this position actuates throttle switch 142 causing movable contact 140 to engage normally open contact 144. This movement causes electrical energy to be supplied through the control switch 120 and the throttle switch 142 by way of leads 146 and 148 to the close limit switch 98 which is in the position illustrated in FIG. 6. This causes electrical energy to be supplied by way of lead 180 to the coil 178 of door close relay 170 energizing the motor 80 by way of lead 174 and causing the door to close until close limit switch 98 is tripped by the door mechanism. When the throttle is returned, for example, to its cruise position, throttle switch 142 is deactivated, movable contact 140 re-engages normally closed contact 150 and electrical energy is applied through open limit switch 100 to actuate relay 168 and energize motor 80 to automatically reopen the condenser door.

Further, a compressor clutch coil 184 is electrically connected to lead 152. Accordingly, the coil 184 automatically declutches the magnetic clutch from and clutches it to the engine in response to movement of the throttle to the near open position and away from the near open position respectively. In this manner, the engine is not loaded by the air conditioning system and maximum engine power is available.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States letters Patent is:

1. An aircraft comprising an air-conditioning system, the aircraft having an external surface with an opening therethrough, a condenser for the air-conditioning system, a condenser frame pivotally mounted on the aircraft for mounting the condenser for movement between a first position retracted within the aircraft and a second position extended from the aircraft into the air stream, a door pivotally mounted on said frame for movement into said opening when said condenser lies in said first position and to a position spaced from said opening when said condenser lies in said second position, means for moving said door into said opening in response to movement of said condenser from second position to said first position and into the position spaced from said opening in response to movement of said condenser from said first position to said second position.

2. An aircraft according to claim 1, wherein said moving means is adapted to extend said door from said aircraft to a location in the airstream when said frame is extended, said door having a surface cooperable with said external aircraft surface to direct a portion of the airstream against said condenser.

3. An aircraft as defined in claim 1 in which said door in said opening having an external surface lying substantially flush with the aircraft surface surrounding said opening.

4. An aircraft according to claim 1, wherein said condenser in said second position thereof is inclined relative to said aircraft and forms an acute angle therewith opening in the aft direction.

5. An aircraft according to claim 1, wherein said condenser is located in the fuselage of the aircraft, said opening being located on the underside of said fuselage, said condenser in said first and said second positions being disposed on respective opposite sides of said surface.

6. An aircraft according to claim 1, including a throttle movable between substantially full open and closed positions, means coupled between said throttle and said moving means for moving said condenser into said first position in response to movement of said throttle into said substantially full open position.

7. An aircraft according to claim 1, including a throttle movable between substantially full open and closed positions, means coupled between said throttle and said moving means for moving said condenser into said second position in response to movement of said throttle away from said substantially full open position.

8. An aircraft according to claim 3, including means coupled between said throttle and said moving means for moving said condenser into said second position in response to movement of said throttle away from said full open position.

9. An aircraft according to claim 1, wherein said condenser in said second position thereof is inclined relative to said aircraft and forms an acute angle therewith opening in the aft direction.

* * * * *